Aug. 11, 1925.

E. RODOLAUSSE 1,549,563

SPEED CONTROLLING DEVICE FOR RAILWAY, TRAMWAY, AND SIMILAR TRAINS

Filed May 3, 1921 — 4 Sheets-Sheet 1

INVENTOR:
Eloi Rodolausse
ATTORNEY.

Aug. 11, 1925.  
E. RODOLAUSSE  
1,549,563  
SPEED CONTROLLING DEVICE FOR RAILWAY, TRAMWAY, AND SIMILAR TRAINS  
Filed May 3, 1921  
4 Sheets-Sheet 2
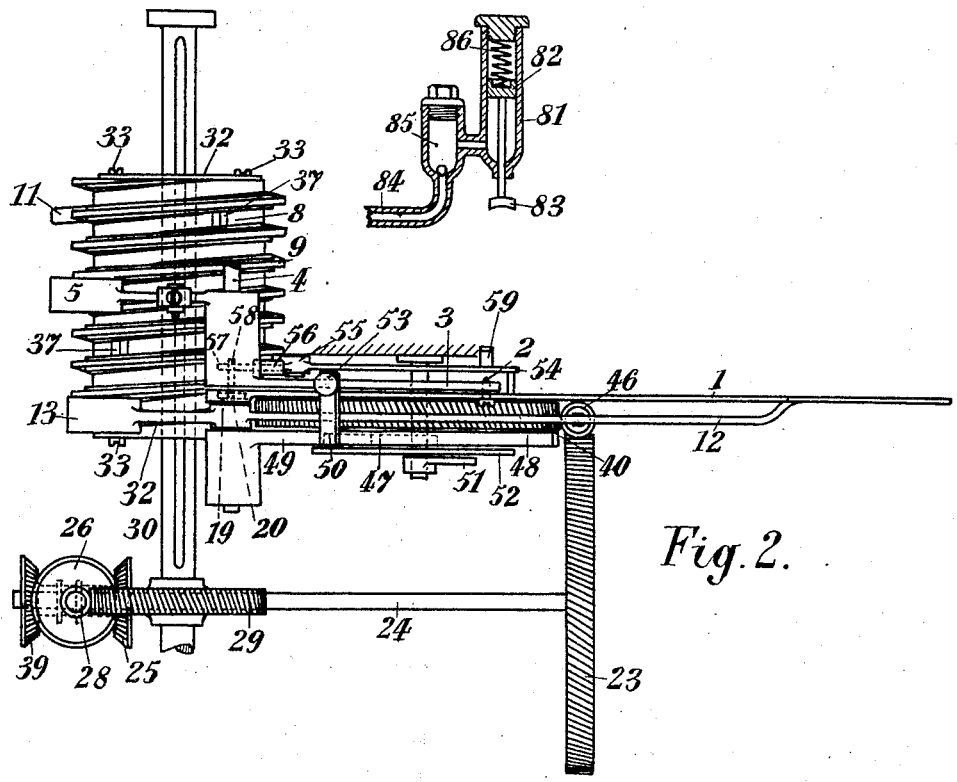
INVENTOR:  
ELOI RODOLAUSSE.  
ATTORNEY.

Aug. 11, 1925.
E. RODOLAUSSE
1,549,563
SPEED CONTROLLING DEVICE FOR RAILWAY, TRAMWAY, AND SIMILAR TRAINS
Filed May 3, 1921          4 Sheets-Sheet 3
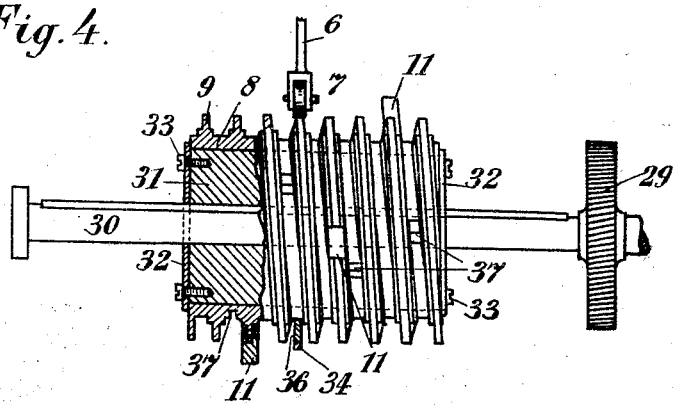
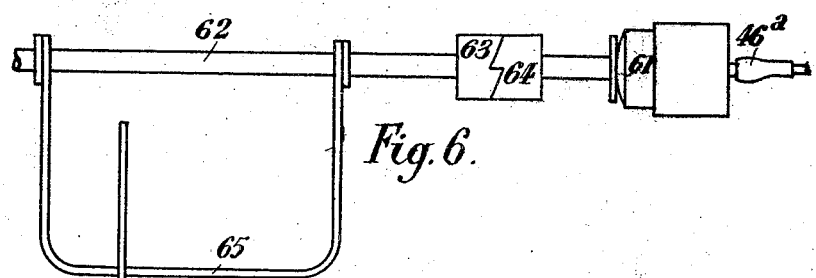
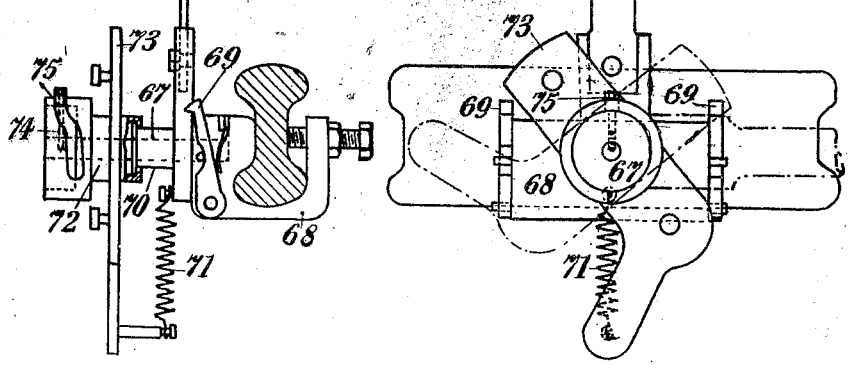
INVENTOR:
ELOI RODOLAUSSE.
ATTORNEY.

Aug. 11, 1925.  1,549,563

E. RODOLAUSSE

SPEED CONTROLLING DEVICE FOR RAILWAY, TRAMWAY, AND SIMILAR TRAINS

Filed May 3, 1921   4 Sheets-Sheet 4

INVENTOR:
Eloi Rodolausse
Attorney

Patented Aug. 11, 1925.

1,549,563

UNITED STATES PATENT OFFICE.

ELOI RODOLAUSSE, OF ST. ANTONIN, FRANCE.

SPEED-CONTROLLING DEVICE FOR RAILWAY, TRAMWAY, AND SIMILAR TRAINS.

Application filed May 3, 1921. Serial No. 466,432.

*To all whom it may concern:*

Be it known that I, ELOI RODOLAUSSE, a citizen of the French Republic, and resident of St. Antonin, Tarn and Garonne, France, have invented certain new and useful Improvements in Speed-Controlling Devices for Railway, Tramway, and Similar Trains, of which the following is a specification.

My present invention relates to improvements in speed controlling devices to be arranged in the reach of the driver and serving to supervise and control the prescribed stoppages and decreases of speed and to automatically apply the brakes, should the speed of the train be too high or if the prescribed stoppings and decreases of speed are not dealt with according to instructions.

Heretofore speed controlling devices of the kind described have been known, which comprise two moving devices connected to each other and one of which is provided with a centrifugal regulator actuating a pointer, whilst the other carries a finger which is rotated by the centrifugal regulator through the agency of a transmission gearing and the movable shaft of which is under the influence of an electro-magnet, which brings the same into engagement with a worm actuating a second pointer, in such a way that if said pointers engage each other, the circuit of an electro-magnet will be closed and caused to actuate a valve to open the pressure air conduit or pipe.

Said devices are furthermore associated with a map of the track in the form of a strip or band, which controls the speed at every point of the distance to be run through.

In contradistinction to these old devices, my present invention has for its object to provide an improved apparatus of the kind described, which comprises a combination of devices, all of which are actuated mechanically instead of electrically and the upkeep of which requires merely a quarterly inspection, said apparatus having no electrical generator, the upkeep of which is very expensive and which sometimes fails to operate, which is not at all admissible in safety devices of this kind and should be avoided.

The devices, the combination of which form the subject matter of my present invention, are the following:

1. A supervision and control device for the speed of trains, comprising an interchangeable wheel arranged on a fixed shaft, and actuating a device which opens the pressure air conduit as soon as the prescribed speed of the train is surpassed or if prior to the stoppage of the train the speed thereof is not or insufficiently reduced.

2. A device which in special cases permits the controlling mechanism to be automatically disconnected and the normal speed to be again obtained.

3. A screw-like cylindrical track map provided with a device permitting the position of the same to be inspected at certain intervals.

4. A device for reducing the speed of the train according to the air pressure on the brakes.

5. An apparatus controlling the automatic operation of the brakes.

6. A particular apparatus arranged on the railway track.

7. A device arranged on the locomotive and by means of which the first named devices are actuated through the agency of pressure air.

In these various devices all of the parts are actuated mechanically instead of electrically as heretofore whereby expenses resulting from the use of electric materials will be saved and a safer operation of the apparatus will be obtained, as it is well known that electrically operated safety devices often fail, which is most dangerous for traffic.

Furthermore the graphical record of the automatic operation of the brakes is an adequate means for constraining the driver of the train to pay careful and continuous attention, whereby the safety of the working of the railway will be increased.

The factor of safety is increased by the fact that the speed of the train is reduced in accordance with the pressure of the brake actuating air. Furthermore the possibility of again running at the permissible speed if the signal-arm is in its "all right" position or the speed is sufficiently decreased, leaves to the driver his full initiative.

In order to facilitate the understanding of my present invention, I have illustrated the same in the accompanying drawings, wherein:

Fig. 2 is a top plan view of the apparatus shown in Fig. 1;

Fig. 4 is a front elevation partly in section of the cylinder carrying the screw shaped track map.

Fig. 5 is a front elevation of a pivoted lug arranged on the railway track.

Fig. 6 is an edge view of said lug and the device arranged on the locomotive and actuated by said lug.

Fig. 11 shows a device for supervising the speed of the train.

Figure 1:
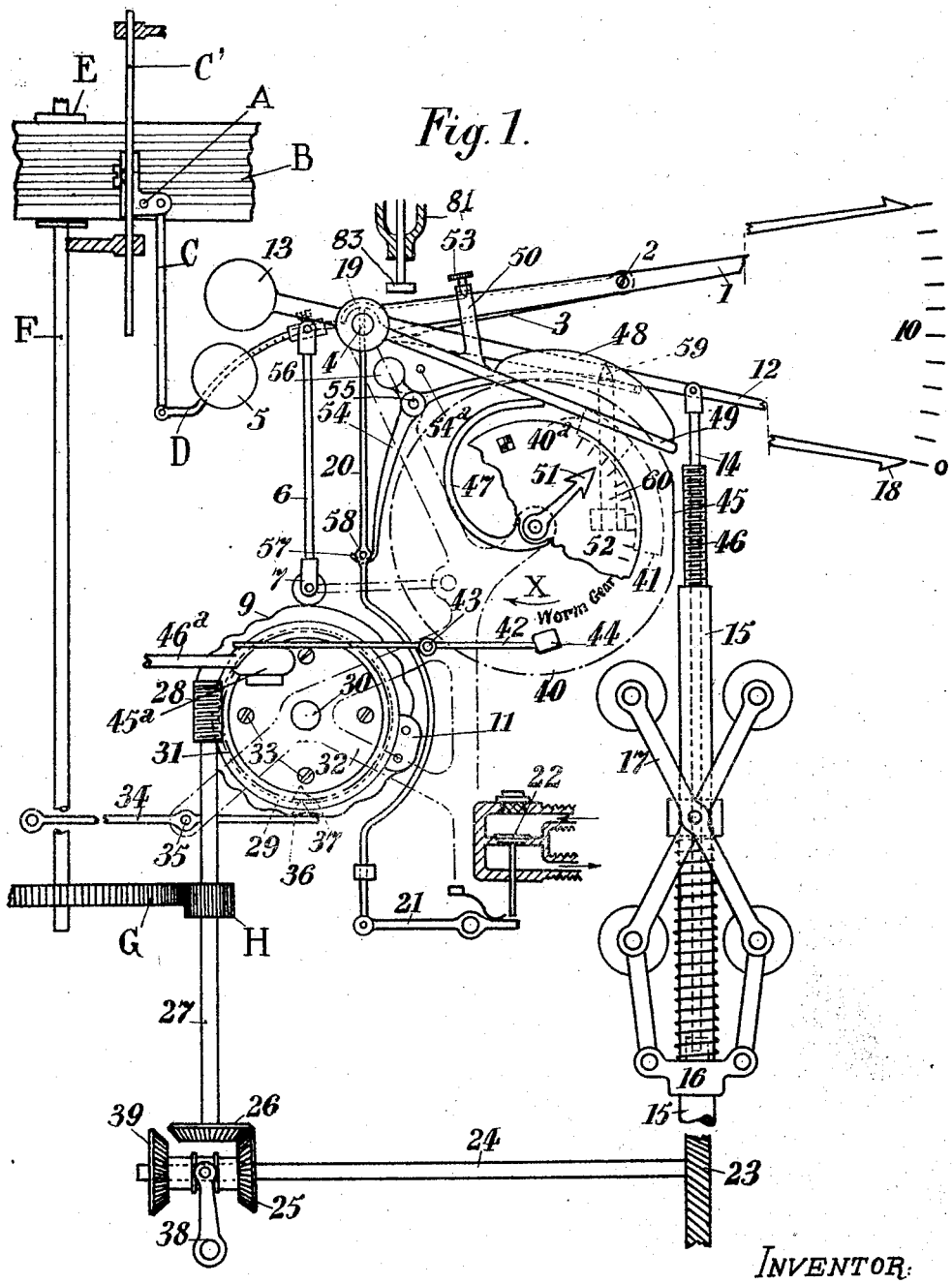
Fig. 1 is a front elevation of the apparatus in its inoperative position.
Figure 3:
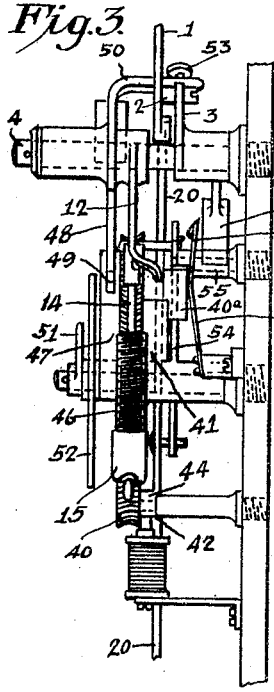
Fig. 3 show a detail of the neutralizing device.
Figure 7:
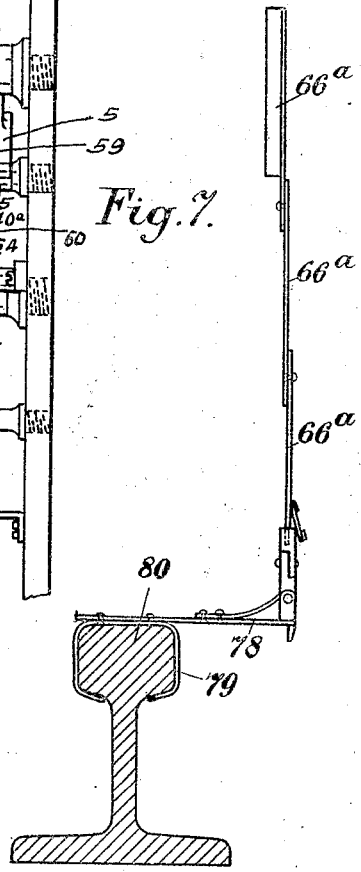
Figs. 7 to 10 show a modification of the device shown in Figs. 5 and 6.
Figure 8:
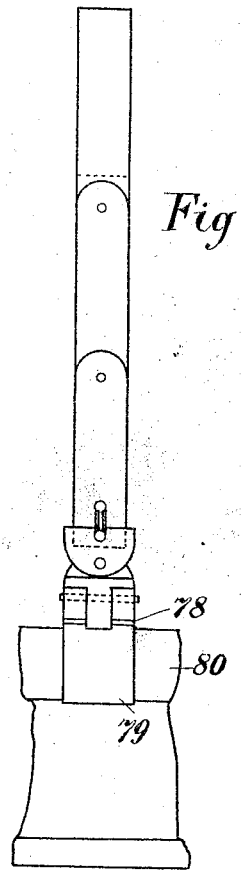
Figure 9:
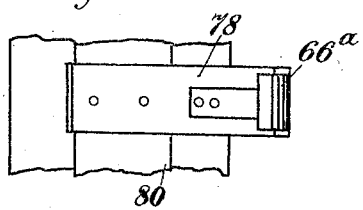

The device arranged on the locomotive comprises a pointer 1 serving to indicate the speed of the train to the driver, which speed must not be surpassed, as well as the decrease of speed and stopping and the approach to a signal indicating "Caution" or "Line not clear".

Said pointer 1 is arranged on a shaft 2, around which it is adapted to swing as will be described hereinafter, and said shaft is carried by the end of an arm 3, which is loosely arranged on a shaft 4.

Said arm 3 which is balanced by means of a counter-weight 5, is adapted to swing around the shaft 4 and is actuated by the projections of the screw-threads 9 through the agency of a bar 6 provided with a roller 7, said screw-threads representing the drawing or map of the railway track and being enclosed within a casing (not shown) and rotated by the wheels of the locomotive.

Said screw-threads 9 representing the map of the railway track are coiled around a rotatable cylinder 8 and have their edges provided with undulated projections corresponding to the drawing of the track and serving to impart different amounts of swinging movements to the pointer 1 and arm 3 through the agency of the bar 6, the roller 7 of which engages said projections, it being understood that said pointer 1 is positioned so that the driver of the locomotive is enabled to easily see the swinging movements thereof over a quadrant 10 provided with a scale. This enables the driver to easily and continuously see the speed which the train must not exceed.

The screw 9 may also be provided with auxiliary projections 11 which are secured to the same as by means of screw-pins and correspond to a given place on the railway track, for instance a place where the railway track is about to be repaired.

Also loosely arranged on the shaft 4 is a second pointer 12 balanced by means of a counter-weight 13, said second pointer being in relation with the speed of the train, in that it is actuated by a rod 14 guided within a hollow shaft 15, which is connected to the movable sleeve 16 of a centrifugal regulator 17, rigidly secured to the shaft 15 actuated by the wheels of the locomotive.

The pointed end 18 of the pointer 12 will be moved over the same quadrant 10 as the first named pointer 1 and said pointer 12 is suitably bent as shown in Fig. 2, so as to have its pointed end 18 located in a common vertical plane with the pointer 1, whereby said pointers will be caused to engage each other if the driver does not reduce the speed as shown by the pointers or if the speed of the train exceeds the prescribed maximum speed.

The result of the engagement of both pointers 12 and 1 is to cause the latter to swing around its supporting pivot-pin 2, whereby the end portion 19 of the pointer 1 strikes the rod 20 which is connected to the operating lever 21 of the pressure air valve 22, thus applying the brakes.

The tubular shaft 15 is provided at its lower end with a worm (not shown), meshing with the worm gear 23 secured to the shaft 24, from which the movement corresponding to the speed of the train is transmitted by means of conical gear wheels 25, 26 to a shaft 27 which in turn actuates the shaft 30 carrying the screw-threads 9 through the agency of a worm 28 and a worm gear 29.

Thus the movement of the wheels of the locomotive will be transmitted to the shaft 30 and track-map or screw-threads 9, the latter being arranged on the cylinder 8 which in turn is applied on the cylnder 31 in such a way that it moves axially the same during the trip in order to cause the pointer 1 to swing automatically according to the data of the screw-threads 9.

To this end said track-map 9 is feathered on the drum 8 so as to be adapted to have a sliding movement on said drum, said track-map being secured on the drum 8 by means of disk plates 32 and screw-pins 33.

The object of this arrangement is to permit the track-map 9 to be rotated on the drum 31 for the purpose of adjusting the same and changing the adjusted position during the trip if necessary.

The track map 9 will be shifted on the shaft 30 by means of a lever 34, provided at one end with a projecting tooth 36 engaging the screw-threads 9 and also adapted to engage notches 37 in the cylinder 8 which correspond to definite points of the railway-track, for instance stations and the like. Said lever 34 is pivoted at 35 and connected with the operating lever, designed for example to operate the usual whistle (not shown). Said lever 34 may also be actuated by a pedal arranged on the track to cause the tooth 36 to engage the notch 37 corresponding to a given point of the track such as a station where the train is to be stopped. Thus the screw like track map 9 may be adjusted at each station or any other point of the track in order to correct irregularities and defective coincidences of the movements, resulting from sliding movements of the wheels or any other action between two successive stoppings.

The screw-thread 9 which represents the railway-track graphically is adapted to comprise any length of track, and it may be used on trips in either direction, it being only necessary to move the lever 38 in the desired direction to cause the gear wheel 26 to mesh with the gear wheel 25 or the gear wheel 39 respectively.

The companion pointer 1 which is normally swung by the track-screw 9 as described may also be actuated as follows if the train is approaching a signal set to "Line not clear."

A worm-gear 40 is provided with a balance-weight 41 having tendency to rotate the wheel 40 in the direction of the arrow X on its shaft. Said worm gear is normally held against rotation by a lever 42, pivoted at 43 and engaging a lug 44 on said wheel 40. The latter has a cut away portion 45, which normally prevents the worm gear 40 from meshing with the worm 46 carried by the shaft 15 already described.

In the construction illustrated the stop-lever 42 of the worm gear 40 may be actuated by means of a pneumatic cushion 45$^a$, which causes rotation of said lever if the locomotive on its trip engages means to be later described arranged on one of the rails of the track and acting on a pressure device on the locomotive, said device acting through a pipe 46$^a$ on the pneumatic cushion 45$^a$ on which the end of the lever 42 rests. If the stop lever 42 is actuated in this way, the freed worm gear 40 will be rotated by the action of the weight 41 in the direction of the arrow X whereby it will be caused to mesh with the worm 46 which will cause the worm wheel 40 to make a complete revolution.

The worm gear 40 is provided with a cam 47 of particular shape, and resting on said cam is a lever 49 weighted as shown in 48 and having a projecting arm 50 which is positioned so that on its downward movement it engages the lever 3 carrying the pointer 1, whereby the latter will be moved over the quadrant 10 until it points to the division 0 thereof.

The shape of the cam 47 is such that the speed of the train will be reduced by its action, said cam permitting the lever 49 to be progressively brought nearer to the center of the worm gear 40 in accordance with the approach to the signal. The rotation of said cam may be observed from the outside by means of a pointer 51 rigidly secured to the shaft of the worm-gear 40 and moving over a quadrant 52 provided with a scale divided in meters, which shows to the driver the movement of the train towards the signal set at "Line not clear", so that he may adjust the speed of the train.

To enable the cam 47 to be used for trains running at different rates of speed, the arm 50 of the lever 49 is provided with a set-screw 53 which may be adjusted to regulate the moment the lever 49 when moved downwardly, engages the arm 3 carrying the pointer 1 and lowers the same over the quadrant 10 to the zero position thereof.

The apparatus is also provided with a neutralizing lever 54 which is designed to prevent the brake valve 22 from being opened untimely if the driver on the normal trip reduces the speed of the train say to 30 kilometers per hour, which speed may be considered sufficiently low to allow the driver to retain control of the train.

Said lever 54 is arranged to swing around its shaft 55 under the action of a spring not shown in the drawings, said lever being balanced by a weight 56 and provided with an extension 57, which normally engages a projection 58 of the operating lever 20 of the brake valve 22 and is held in that position by pointer 12 which rests on the free end of said lever 54.

After the train has started, said lever 54 is merely under the influence of its spring, whilst the pointer 12 will be raised in accordance with the increase of speed.

Now if the speed of the train has reached a rate of say 30 kilometers per hour, the neutralizing lever 54 will be arrested by a stop 54$^a$ and held by the same in such a position that the extension 57 will be disengaged from the projection 58 on the lever 20, and that the brakes will be applied when both pointers 12 and 1 engage each other under the above described conditions.

In the event the lever 42 releases the wheel and the latter begins its rotary motion, the projection 40$^a$ is carried with the wheel 40 and no longer keeps the stopping tooth 59 out of the path of the end portion of lever 54; if at this instant pointer 12 is moving downwards below the previously adjusted speed of 30 kilometers or less, stop 59 maintains the lever 54 interlocked and the projection 57 of the latter locks rod 20; when the train stops, pointer 12 may rise above the division indicating 30 kilometers an hour (or less according to the previously made adjustment) and lever 54, maintained by stop 59, no longer prevents the pointers 1 and 12 from meeting without the valve 22 operating the brakes. At the end of the revolution of wheel 40, the projection 40$^a$ sets the stop 59 aside whereby lever 54 is again free. Such mechanism is necessary, because after a stopping of the train, the cam has not yet finished its revolution and a meeting of both pointers necessarily occurs, the supervision pointer 1 being still moving downwards whereas pointer 12 is moving upwards under the action of the speed. Lever 54 may also be operated by a pushing device 54$^b$ when wheel 40 rotates, the stop 59 maintaining the lever 54 interlocked until the end of the revolution of said wheel, thus permitting, if the signal on the track is put at "Line clear" after the wheel 40 has become unlocked, the travel of the train to continue, without interference from the automatic applying of the brakes.

When in such circumstances the pointers 1 and 12 meet each other, the counterweight 48 of lever 49 is raised by the centrifugal action or pressure, thus preventing the rupture of the device.

The pneumatic cushion 45$^a$ which supports the end of the lever 42 of the worm gear 40, will be inflated by means of a device arranged on the front part of the locomotive (Fig. 6) and comprising a pressure device 61 connected by a conduit 46$^a$ to the cushion 45$^a$, said device being actuated by the rotation of a shaft 62 provided with a member 63 having a screw or helical face on one side, cooperating with a similar face of a member 64 on the shaft of the device 61 to force the latter forwardly by the rotation of the shaft 62.

In the arrangement illustrated in the drawings, the shaft 62 carries a yoke shaped operating member 65 arranged at right angles to said shaft, which will be rotated upon the engagement of the yoke 65 with a stationary lug arranged on the railway track (Figs. 5 and 6).

Said lug is formed of a flat metal bar 66 arranged on a fixed shaft 67 which is rigidly connected to a carrier 68, adapted to be removably secured to the rail of the track at a given distance from the signal. The bar 66 is firmly connected to the operating device of the signal-arm, but it is adapted to freely rotate around its shaft, after it has been brought into its vertical position by the operation of the signal-arm, upon engagement with the yoke 65 of the air compressing device 61 arranged on the locomotive. Moved to its horizontal position, said bar 66 will be engaged and retained by one of the spring hooks 69 arranged on the carrier 68.

The metal bar 66 is connected to a sleeve 70, adapted to be shifted in either direction on the shaft 67 and to rotate on the latter when the signal is at "Line not clear", in order to disengage the bar 66 from the hook 69 which retains said bar in its horizontal position, whereby said bar will move to its vertical position as in Fig. 5.

To this end said sleeve 70 will be actuated by a rotatable sleeve 72 which is provided with an arm 73 connected to the operating member of the signal arm, said sleeve 72 having also a cam groove 74 engaged by a pin 75. Said rotatable sleeve 72 is adapted to be thus shifted longitudinally as well as the sleeve 70 and the metal bar 66 connected to the same. Furthermore said bar is adapted to be rotated independently of the position of the signal arm. However said bar 66 will be independent of the signal arm if the latter is set to "Line not clear" and it is then adapted to freely swing towards the left and towards the right and move downwardly to a horizontal position if it is engaged by the yoke 65 of the air compressing device 61 on the locomotive.

The devices so far disclosed operate as follows:

All the parts are in their inoperative positions shown in Fig. 1 and the pointer 1 is adjusted for a fast or express trip.

The neutralizing lever 54 is forced backwardly by the pointer 12 so that the extension 57 thereof lies under the projection 58 of the brake operating lever 20. The worm gear 40 is provided at the rear with a projection 40$^a$ which retains a tooth 59 of the spring blade 60 at a given distance from the neutralizing lever 54.

Upon the starting of the train, the shaft 24 will be rotated and actuate the pointer 12 and at the same time rotate the screw 9 as described, which causes the pointer 1 to swing.

So long as the train runs at a normal rate of speed, the pointer 1 will swing over the quadrant 10 according to the profile of the screw 9 which represents the railway track graphically, in order to indicate the respective permissible speed on the track section to the driver.

The lower pointer 12 swings also over the quadrant 10 under the influence of the speed of the train and moves away from the neutralizing lever 54, so that if the speed of the train has reached a rate of say 30 kilometers per hour, the extension 57 of the lever 54 will be completely disengaged from the projection 58 of the brake operating lever 20, whilst the opposite end of said lever 54 will be brought below the tooth 59, said lever resting at the same time against the stop 54$^a$.

The pointer 12 always swings freely with respect to the pointer 1 so long as the speed of the train does not exceed the rate of speed indicated by the pointer 1 on the quadrant 10, and said pointers 1 and 10 do not engage each other as long as the driver of the locomotive regulates the speed according to the indications of said pointer 1.

But if the indications of the pointer 1 are not dealt with and the speed of the train becomes higher, than the speed permissible on the respective section of the track, the two pointers will engage each other, whereby the pointer 1 will be suddenly rotated around its pivot-pin 2 and force the brake operating lever 20 downwardly as described, whereby the brakes will be applied.

If the train approaches to a signal set on "Line not clear", the track bar 66, which has been moved to its vertical position by the operation of the signal arm, will engage the yoke 65 on the locomotive, whereby the compressor 61 or any other equivalent device on the locomotive will be actuated to release the worm gear 40 as described and rotate the same with the cam 47 by means of the shaft 15 actuated by the wheels of the locomotive.

Said cam 47 will make a complete revolution during which the driver will be warned by the rotation of the hand or pointer 51 over the dial 52 that the train approaches the signal.

In fact the cam 47 causes the weight 48 to be lowered together with the lever 49, which carries the pointer 1 with it to the zero position on the quadrant 10.

The projection 40$^a$ of the worm gear 40 leaves the spring blade 60 so that the tooth 59 of said spring may again adjust itself automatically in the path of the neutralizing lever 54.

If the driver of the locomotive reduces the speed of the train sufficiently, the two pointers 1 and 12 will swing together over the quadrant 10 without engaging each other and the pointer 12 accompanies the pointer 1 when the latter is moved to the zero on the quadrant 10.

When said pointer 12 informs the driver of the locomotive that the speed of the train has been decreased to a rate of 30 kilometers per hour, said pointer 12 will pull the neutralizing lever 54 with it, which thus engages the operating lever 20 of the brake valve 22. Said neutralizing lever 54 will be temporarily held in this position, owing to its engagement with the tooth 59 of the spring blade 60, from which it will again be disengaged after the cam 47 has made a complete revolution, when the projection 40$^a$ of the worm gear 40 has forced the spring blade 60 backwardly.

If the reverse of the foregoing occurs, that is if the driver of the locomotive does not decrease the speed of the train or if the train does not stop in the event of a signal adjusted to "Line not clear", the pointer 1 will engage the pointer 12 on its downward movement and actuate the brake operating lever 20 as described, whereby the brakes will be applied and the train stopped.

The apparatus described may be provided with means for automatically recording these various conditions of the trip. To this end the free end of the pivoted arm 3 has an extension D to which is pivotally connected a rod C (Fig. 1) carrying a suitable stylus A at its upper end and guided along a stationary vertical bar C' to draw a diagram corresponding to the swinging movements of the pointer 1 on a record strip of paper B, moved by a rotating drum E secured to a vertical shaft F, the lower end of which is provided with a gear wheel G meshing with a pinion H fast on the transmission shaft 27.

Furthermore the apparatus may be provided with a device whereby the speed of the train may be adjusted in accordance with the pressure of air in the brake conduit for the purpose of maintaining the factor of safety which will now be described.

A cylinder 81 is connected through a channel 84 to the main conduit of compressed air, so that the piston 82 will be under the pressure of such compressed air whilst its opposite face is under the pressure of coil-spring 86, whereby said piston will be reciprocated according to the pressure of air within said conduit. The piston rod is provided with an extension 83, by means of which said device rests on the lever 3 of the pointer, so that upon a great decrease of pressure within the cylinder 81, said extension 83 of the piston rod will push the lever 3 downwards whereby the pointer 1 is turned to the zero of the quadrant 10, when under the action of the spring 86, the rod 83 brings the lever 3 back and the pointer 1 is brought back to the speed corresponding to the pressure of the air. During this motion of pointer 1, it will meet the pointer 12 if the latter is in a position indicating a speed above that corresponding to the air pressure.

A ball-valve 85 resting on a seat provided with a narrow slot serves to retard the escape of air and avoid sudden motion of the pointer 1, which would result in an untimely application of the brakes.

The spring 86 must be adjusted according to the air pressure, so that the piston rod may move the pointer 1 downwardly to the rate of speed correspondnig to the air pressure.

The result thereof is that if on the trip insufficient pressure of air occurs, the pointer 1 will be brought automatically to a position corresponding to said decreased pressure, whereby the driver of the locomotive will be constrained to go on at this rate of speed until the pressure of air is again at its normal degree, whereupon the train may again run at the prescribed higher rate of speed.

If the compressed air is under normal pressure, the piston will be in the position shown in Fig. 1, that is it will be completely disengaged from the lever 2, whereby the train is allowed to run at a maximum rate of speed. However if on the trip the pressure of air is lowered to such extent that there will be a danger, the pressure of air on the piston 82 will become insufficient to balance the pressure of the spring 86, and said piston will be moved downwardly carrying with it the pointer 1 until the same is in a position corresponding to the rate of speed allowed for the decreased pressure of air. The result thereof is that the driver of the locomotive will be constrained to reduce the speed of the train; otherwise the pointer 1 will engage the speed pointer 12 and cause the brakes to be automatically applied. Therefore said speed must be maintained until the pressure will be increased and the pointer 1 permitted to move to a position corresponding to the maximum rate of speed.

In the above disclosure I have described an arrangement wherein the bar 66 (Fig. 6) is connected to a permanent signalling device on the track which is usually the case.

But it may occur that the train is under the influence of other signals, for instance at places where the track is about to be repaired or where the track is subsoiled or otherwise injured.

In such cases I use a similar bar 66 and apply the same to the rail of the track upwardly from said place as shown in Figs. 7 to 10 of the accompanying drawings.

Figure 10:
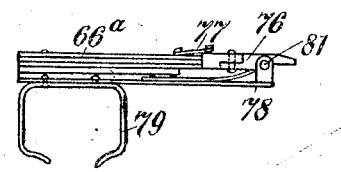

The bar 66ᵃ (similar to the bar 66 of Figs. 5 and 6) is composed of sections hinged together and adapted to be collapsed upon each other, the collapsed or folded bar being adapted to be housed within a casing 76 and held in its collapsed condition by means of a hook 77 or the like as shown in Fig. 10.

The casing 76 is pivotally mounted at 81 on a carrier 78, which may be arranged on the head of the rail by means of a spring clasp 79, when the bar 66ᵃ will be extended (Figs. 7, 8), whereupon the device is ready to operate at the passage of a train. Said bar 66ᵃ causes rotation of the yoke 65 on the locomotive, whereby the air cushion 45ᵃ will be inflated and the lever 42 operated. During the passage of a train the carrier 78 and spring clasp 79 will be crushed so that the parts which may be formed and gathered on the track cannot be utilized for another signalling.

I wish it to be understood that all the parts herein described and illustrated in the accompanying drawings may be changed as desired without departing from the scope of this invention as hereinafter claimed.

Having now fully described my said invention, what I claim and desire to secure by Letters Patent, is:

1. Apparatus for supervising and controlling the stoppings and speed reducings of rail road, tramway, and the like trains, comprising a train, a compressed air brake system on the train including a compressed air line and a valve on said line, a rotatable normally inactive supervision pointer indicating the maximum permissible speed, mechanical connecting means between said supervision pointer and said valve whereby the pointer controls the valve of the compressed air line, a rotatable actual speed indicating pointer, a train axle, transmitting means between said actual speed pointer and the wheel axle, a graduated speed indicating sector along which both said pointers pivot in the same plane of oscillation, whereby the oscillating actual speed indicating pointer meets and operates the normally inactive supervision pointer and causes the applying of the brakes when the train attains the maximum permissive speed, means for operating the supervision pointer independently from the actual speed indicating pointer when the train approaches a caution indicator on the track, means on the track for operating in such conditions said operating means of the supervision pointer, means whereby the speed of the running train may be adjusted in accordance with the air pressure within the compressed air line, means for automatically neutralizing in certain circumstances the controlling mechanism, and means for recording the automatic applying of the brakes.

2. In an apparatus for supervising and controlling the stoppings and speed reducings of rail road, tramway, and the like trains, a device whereby the speed of the running train may be adjusted in accordance with the air pressure within the compressed air line, a supervision pointer, a carrying lever therefor, an air line, a cylinder, a connecting duct between air line and cylinder a piston slidably engaged within said cylinder, one face of said piston being under the pressure of the air in the compressed air line, the opposite face being under the action of a regulable helical spring, a rod on said piston extending through the bottom of said cylinder and bearing on the carrying lever of the supervision pointer, whereby the latter is operated in such a manner that the maximum permissive speed is regulated according to the air pressure within the compressed air line of the brakes.

In testimony whereof I have hereunto set my hand.

ELOI RODOLAUSSE.